(12) United States Patent
Wang et al.

(10) Patent No.: US 11,582,395 B1
(45) Date of Patent: Feb. 14, 2023

(54) GIMBAL DEVICE

(71) Applicant: PRIMAX ELECTRONICS LTD., Taipei (TW)

(72) Inventors: Hsiu-Wen Wang, Taipei (TW); Chih-Wen Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/457,708

(22) Filed: Dec. 6, 2021

(30) Foreign Application Priority Data

Nov. 8, 2021 (TW) .................................. 110141499

(51) Int. Cl.
*H04N 5/232* (2006.01)
(52) U.S. Cl.
CPC ..... *H04N 5/23299* (2018.08); *H04N 5/23219* (2013.01)
(58) Field of Classification Search
None
See application file for complete search history.

(56) References Cited

U.S. PATENT DOCUMENTS

| | | | | |
|---|---|---|---|---|
| 9,794,724 | B1* | 10/2017 | Shintani | H04R 1/40 |
| 10,521,663 | B1* | 12/2019 | Claussen | G06V 20/13 |
| 2014/0049643 | A1* | 2/2014 | Segerstrom | F21V 21/30 |
| | | | | 250/234 |
| 2017/0265014 | A1* | 9/2017 | Shintani | H04S 7/302 |
| 2018/0136650 | A1* | 5/2018 | Tian | G06V 10/147 |
| 2019/0349533 | A1* | 11/2019 | Guo | H04N 5/2253 |
| 2019/0373173 | A1* | 12/2019 | Wang | H04N 5/23241 |
| 2020/0003357 | A1* | 1/2020 | Su | B64D 47/08 |
| 2020/0012296 | A1* | 1/2020 | Gurdan | B64F 1/22 |
| 2020/0072407 | A1* | 3/2020 | Aharon | F16M 11/12 |
| 2020/0096844 | A1* | 3/2020 | Liao | G03B 15/006 |
| 2020/0271269 | A1* | 8/2020 | Liu | F16M 11/2071 |
| 2020/0293046 | A1* | 9/2020 | Liu | G05D 1/101 |
| 2020/0356112 | A1* | 11/2020 | Liu | G06F 3/0488 |
| 2020/0405411 | A1* | 12/2020 | Draper | A61B 1/00149 |
| 2020/0408914 | A1* | 12/2020 | Mountney | G01B 11/26 |
| 2021/0018138 | A1* | 1/2021 | Wang | F16M 11/2014 |
| 2021/0021763 | A1* | 1/2021 | Zhou | G01S 3/808 |

(Continued)

FOREIGN PATENT DOCUMENTS

EP 3315414 A1 * 5/2018 .......... B64C 39/024
WO WO-2018019290 A1 * 2/2018 ............. G06F 3/01

*Primary Examiner* — Stefan Gadomski
(74) *Attorney, Agent, or Firm* — WPAT, PC

(57) ABSTRACT

A gimbal device for supporting an external photographing device includes a depth camera, a control unit and an actuator. The depth camera is configured to obtain spatial coordinates of a subject being photographed. The control unit is configured to determine a direction adjustment value of the gimbal device according to the spatial coordinates. The actuator is configured to receive the direction adjustment value and to adjust spatial orientation of the gimbal device according to the direction adjustment value, so that the external photographing device is able to track the subject being photographed. The control unit is further configured to obtain initial three-axis data of the gimbal device and three-axis data after the gimbal device is set to determine an angle difference between the initial three-axis data and the set three-axis data, and the actuator is further configured to receive the angle difference.

9 Claims, 1 Drawing Sheet

(56) References Cited

U.S. PATENT DOCUMENTS

| | | | |
|---|---|---|---|
| 2021/0044751 A1* | 2/2021 | Tao | G05D 3/12 |
| 2021/0051273 A1* | 2/2021 | Zhang | H04N 5/23218 |
| 2021/0084228 A1* | 3/2021 | Wang | H04N 5/23216 |
| 2021/0168296 A1* | 6/2021 | Su | F16M 11/10 |
| 2021/0281764 A1* | 9/2021 | Ma | H04N 5/23293 |
| 2022/0026907 A1* | 1/2022 | Peng | H04N 5/332 |
| 2022/0038632 A1* | 2/2022 | Peng | G01S 3/7864 |
| 2022/0163874 A1* | 5/2022 | Chang | F16M 11/123 |
| 2022/0166910 A1* | 5/2022 | Chang | H04N 5/2328 |

\* cited by examiner

GIMBAL DEVICE

FIELD OF THE INVENTION

The present invention relates to a gimbal device, and more particularly to a gimbal device including a depth camera.

BACKGROUND OF THE INVENTION

The existing handheld gimbal is to switch a shooting mode required by a user through a button, and it is necessary to install an application in the photographing device, and the photographing device is connected to a three-axis stabilizer using Bluetooth to perform two-dimensional image recognition. However, when a moving speed of a subject is too fast, the existing handheld gimbal is prone to lose track of the subject.

SUMMARY OF THE INVENTION

The present disclosure provides a gimbal device for supporting an external photographing device. The gimbal device includes a depth camera, a control unit and an actuator. The depth camera is configured to obtain spatial coordinates of a subject being photographed. The control unit is configured to determine a direction adjustment value of the gimbal device according to the spatial coordinates. The actuator is configured to receive the direction adjustment value transmitted by the control unit and to adjust spatial orientation of the gimbal device according to the direction adjustment value, so that the external photographing device is able to track the subject being photographed. The control unit is further configured to obtain initial three-axis data of the gimbal device and three-axis data after the gimbal device is set to determine an angle difference between the initial three-axis data and the set three-axis data, and the actuator is further configured to receive the angle difference transmitted by the control unit.

In some embodiments of the present invention, the actuator is further configured to adjust an angle of the gimbal device according to the angle difference.

In some embodiments of the present invention, the three-axis data after the gimbal device is set is that after the gimbal device supports the external photographing device, posture of the external photographing device is automatically recognized or manually set to obtain the three-axis data corresponding to the posture after the gimbal device is set.

In some embodiments of the present invention, the control unit is further configured to map the spatial coordinates to the three-axis data after the gimbal device is set to perform calculations to determine the direction adjustment value of the gimbal device.

In some embodiments of the present invention, the gimbal device further includes a support part; and a holder configured to support the external photographing device, in which the actuator is connected between the support part and the holder, and the depth camera is disposed over the support part.

In some embodiments of the present invention, the depth camera is further configured to obtain body posture data of the subject, and the control unit is further configured to receive and recognize the body posture data to determine a control command corresponding to the body posture data.

In some embodiments of the present invention, the body posture data is gesture data.

In some embodiments of the present invention, the control command is to trigger a specific function of the gimbal device. For example, triggering the specific function of the gimbal device may be to make the gimbal device automatically adjust to a specific angle, and the external camera together with it to automatically adjust to a specific posture.

In some embodiments of the present invention, the gimbal device excludes an inertial measurement unit.

It is worth noting that, since the gimbal device of the present invention includes the depth camera, it can track the subject in real time according to the spatial coordinates obtained by the depth camera, so as to improve accuracy and real-time performance of shooting, so it can effectively solve the issue described in the prior art. In addition, the gimbal device of the present invention can receive the body posture data (e.g., the gesture data) through the depth camera, and hand it over to the control unit to recognize the body posture data to determine the corresponding control command, so that the gimbal device or the external photographing device can perform the corresponding control command. As such, the user does not need to press or touch the gimbal device or the external photographing device for switching to the user's desired shooting mode.

DETAIL DESCRIPTION OF THE PREFERRED EMBODIMENT

Figure 1:
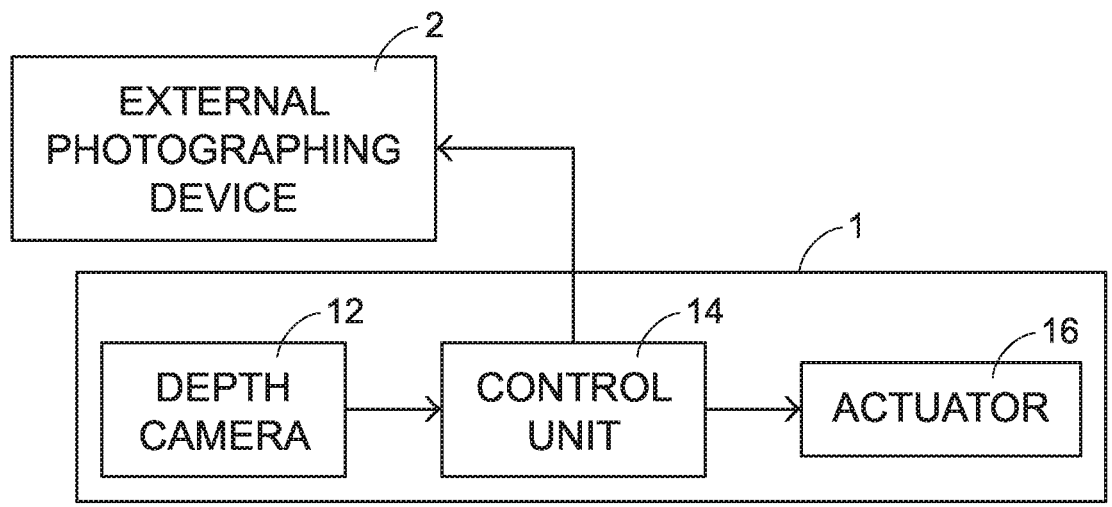
FIG. 1 is a schematic diagram of components of a gimbal device according to an embodiment of the present invention.

The advantages and features of the present invention and the method for achieving the same will be described in more detail with reference to exemplary embodiments and the accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." The spatially relative descriptions used herein should be interpreted the same.

As described in the prior art, the existing gimbal is handheld, and thus the existing handheld gimbal must continue to follow a subject (e.g., a person). However, the existing handheld gimbal is easy to lose track of the subject when the subject moves too fast. Accordingly, the present invention provides a gimbal device for automatic tracking without human intervention, which can be handheld or fixed, for example. The gimbal device of the present invention can track the subject in real time according to spatial coordinates obtained by a depth camera, so as to improve accuracy and real-time performance of shooting. Therefore, the user can set a shooting scene and video himself (or take a self-portrait) quickly, and thus can effectively solve the issue described in the prior art. In addition, the gimbal device of the present invention can receive body posture data (e.g., gesture data) through the depth camera, and hand it over to the control unit to recognize the body posture data to determine the corresponding control command, so that the gimbal device performs the corresponding control command. As such, the user does not need to press or touch the gimbal device for switching to the user's desired shooting mode. Various embodiments of the gimbal device of the present invention will be described in detail below.

FIG. 1 is a schematic diagram of components of a gimbal device according to an embodiment of the present invention. As shown in FIG. 1, the gimbal device 1 is used to support an external photographing device 2. The user can install the external photographing device 2 on the gimbal device 1.

The gimbal device 1 includes a depth camera 12, a control unit 14 and an actuator 16. The depth camera 12 is configured to obtain the spatial coordinates (or can be called as three-dimensional coordinates, which may include depth data) of the photographed object. The spatial coordinates can constitute point cloud data. The depth camera 12 can obtain the depth data through feature changes from the subject near and far mapping to the structured light projection; or can obtain the depth data of the photographed object by the back and forth time difference of light hitting the subject according to the principle of Time of Flying (ToF); or can be a binocular camera to obtain the depth data with stereo relative; or can be a light detection and ranging (Lidar); or can be a Millimeter wave radar.

The control unit 14 is configured to determine a direction adjustment value of the gimbal device 1 (e.g., a rotation value of a three-axis motor of the actuator 16) according to the spatial coordinates. In some embodiments, the control unit 14 includes a system on a chip (SoC), a micro-control unit (MCU) or other suitable processors.

The actuator 16 is configured to receive the direction adjustment value transmitted by the control unit 12, and to adjust spatial orientation of the gimbal device 1 according to the direction adjustment value, so that the external photographing device 2 can track the subject in real time. In some embodiments, the actuator 16 adjusts the spatial orientation of the gimbal device 1 according to the direction adjustment value, so that both the depth camera 12 and the external photographing device 2 can face the position of the subject; that is, both the depth camera 12 and the external photographing device 2 can track the subject in real time.

Figure 2:
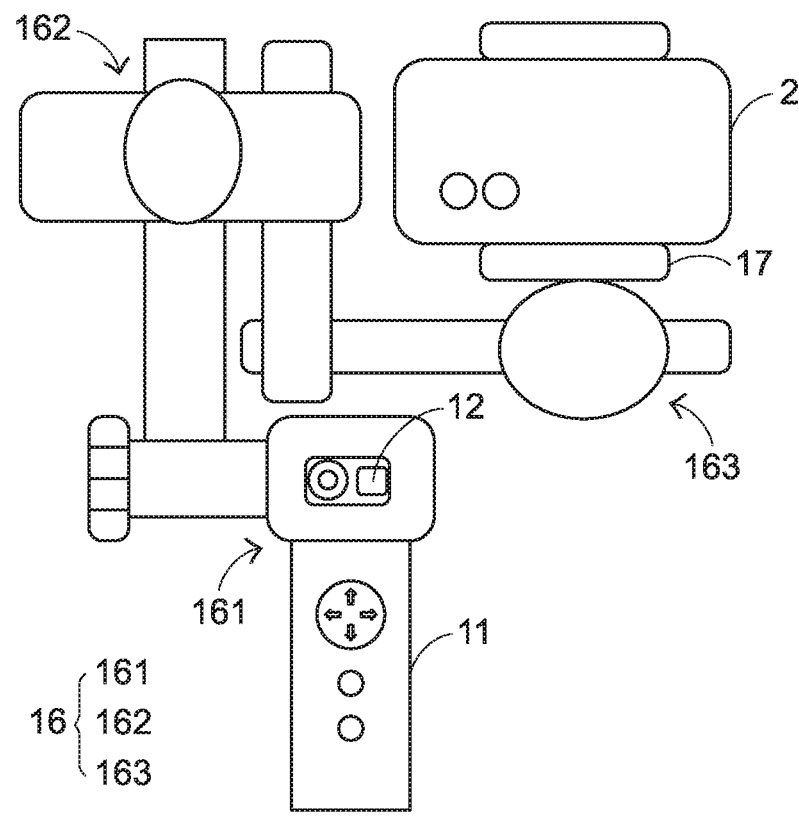
FIG. 2 is a schematic diagram of appearance of a gimbal device according to an embodiment of the present invention.

FIG. 2 is a schematic diagram of appearance of a gimbal device according to an embodiment of the present invention. In some embodiments, the actuator 16 includes a first-axis motor 161, a second-axis motor 162, and a third-axis motor 163 to control angles of the direction axis, roll axis, and pitch axis of the gimbal device 1, thereby controlling the space orientation of the external photographing device 2 to track the subject in real time.

It is worth noting that, referring to FIGS. 1 and 2, the control unit 14 is further configured to obtain initial three-axis data of the gimbal device 1 and three-axis data after the gimbal device 1 is set to determine an angle difference between the initial three-axis data and the set three-axis data. The angle difference can be zero or non-zero.

The initial three-axis data is the initial three-axis data after the gimbal device 1 is turned on but before adjustment. At this time, the gimbal device 1 may or may not support the external photographing device 2. After the gimbal device 1 supports the external photographing device 2, posture of the external photographing device 2 can be automatically recognized or manually set by the user (if the gimbal device 1 is adjusted at this time, the angle of the three axes will be changed), and thus the control unit 14 can obtain the three-axis data corresponding to the posture, which is the above-mentioned three-axis data after the gimbal device 1 is set. The posture of the external photographing device 2 that has been set is the shooting angle set by the photographer. In some embodiments, using automatic recognition to automatically adjust the posture of the external photographing device 2 can be performed by obtaining the body posture data (e.g., the gesture data) of the subject by using the depth camera 12, and then transmitting it to the control unit 14 to recognize the command corresponding to the body posture data, and then actuating the actuator 16 to automatically adjust the gimbal device to the specific angle, and thus can make the posture of the external photographing device 2 reach the set value, so that the control unit 14 obtains the three-axis data corresponding to the posture.

The actuator 16 is further configured to receive the angle difference transmitted by the control unit 14. In some embodiments, the actuator 16 is further configured to adjust an angle of the gimbal device 1 according to the angle difference. As such, the gimbal device 1 can keep the external photographing device 2 approximately at the shooting angle set by the photographer, without too much deviation.

In some embodiments, the control unit 14 is further configured to perform posture mapping calculations on the spatial coordinates of the subject obtained by the depth camera and the three-axis data (or can be called as posture) after the gimbal device is set. In other words, the spatial coordinates are mapped to the three-axis data after the gimbal device is set to perform rotation calculations to determine the direction adjustment value of the gimbal device. Subsequently, the first-axis motor 161, the second-axis motor 162, and the third-axis motor 163 of the actuator 16 can be actuated according to the direction adjustment value provided by the control unit 14 to track the subject.

In some embodiments, the depth camera 12 is further configured to obtain the body posture data of the subject, and the control unit 14 is further configured to receive and recognize the body posture data to determine the control command corresponding to the body posture data. In some embodiments, the body posture data is the gesture data. In detail, the control unit 14 receives the body posture data, and then constructs point cloud data, and then extracts skeleton features of the human body, and then performs body posture data recognition by deep learning operations. As such, the gimbal device 1 of the present invention can activate the gimbal device 1 through the specific body posture shown by the subject, without the need to activate the gimbal device 1 through buttons or touch.

In some embodiments of the present invention, the control command is to trigger a specific function of the gimbal device. For example, the gimbal device 1 can be triggered to automatically adjust to a specific angle through the specific body posture shown by the subject, so that the external photographing device can also be automatically adjusted to the specific posture.

In some embodiments, as shown in FIG. 2, the gimbal device further includes a support part 11 and a holder 17. The support part 11 can also be used as a hand-held part. The holder 17 is configured to support the external photographing device 2. The actuator 16 is connected between the support part 11 and the holder 17. The depth camera 12 is disposed over the support part 11. However, the present invention is not limited to the foregoing embodiments. In other embodiments, the depth camera 12 is disposed at another position in the gimbal device 1 to facilitate the synchronization and real-time tracking of the subject by the depth camera 12 and the external photographing device 2.

It should also be noted that the depth camera 12 of the present invention can also replace an inertial measurement unit (e.g., including a gyroscope, an accelerometer, and a magnetometer) in the existing handheld gimbal. For example, the depth camera 12 of the present invention can not only obtain the spatial coordinates of the subject, but also obtain the dynamic changes of the three-axis data of the gimbal device 1, and the control unit 14 can calculate the compensation angle and the motor speed accordingly, and thus the actuator 16 performs real-time reverse compensation. Therefore, the gimbal device 1 of the present invention has a stabilizing effect in addition to the tracking effect. Therefore, in some embodiments, the gimbal device 1 of the present invention may exclude the inertial measurement unit. However, in other embodiments, the gimbal device 1 of the present invention may include the inertial measurement unit to share the calculation of the control unit 14.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not used to limit the scope of claims of the present invention.

What is claimed is:

1. A gimbal device for supporting an external photographing device, comprising:
   a depth camera configured to obtain spatial coordinates of a subject being photographed;
   a control unit configured to determine a direction adjustment value of the gimbal device according to the spatial coordinates; and
   an actuator configured to receive the direction adjustment value transmitted by the control unit and to adjust spatial orientation of the gimbal device according to the direction adjustment value, so that the external photographing device is able to track the subject being photographed,
   wherein the control unit is further configured to obtain initial three-axis data of the gimbal device and three-axis data after the gimbal device is set to determine an angle difference between the initial three-axis data and the set three-axis data, and the actuator is further configured to receive the angle difference transmitted by the control unit.

2. The gimbal device of claim 1, wherein the actuator is further configured to adjust an angle of the gimbal device according to the angle difference.

3. The gimbal device of claim 1, wherein the three-axis data after the gimbal device is set is that after the gimbal device supports the external photographing device, posture of the external photographing device is automatically recognized or manually set to obtain the three-axis data corresponding to the posture after the gimbal device is set.

4. The gimbal device of claim 1, wherein the control unit is further configured to map the spatial coordinates to the three-axis data after the gimbal device is set to perform calculations to determine the direction adjustment value of the gimbal device.

5. The gimbal device of claim 1, further comprising:
   a support part; and
   a holder configured to support the external photographing device, wherein the actuator is connected between the support part and the holder, and the depth camera is disposed over the support part.

6. The gimbal device of claim 1, wherein the depth camera is further configured to obtain body posture data of the subject, and the control unit is further configured to receive and recognize the body posture data to determine a control command corresponding to the body posture data.

7. The gimbal device of claim 6, wherein the body posture data is gesture data.

8. The gimbal device of claim 6, wherein the control command is to trigger a specific function of the gimbal device.

9. The gimbal device of claim 1, wherein the gimbal device excludes an inertial measurement unit.

\* \* \* \* \*